(12) United States Patent
König et al.

(10) Patent No.: US 9,314,954 B2
(45) Date of Patent: Apr. 19, 2016

(54) METHOD FOR CONSTRUCTING BODIES THAT ROTATE IN THE SAME DIRECTION AND ARE IN CONTACT WITH ONE ANOTHER AND COMPUTER SYSTEM FOR CARRYING OUT SAID METHOD

(75) Inventors: Thomas König, Leverkusen (DE); Michael Bierdel, Leverkusen (DE)

(73) Assignee: BAYER INTELLECTUAL PROPERTY GMBH, Monheim (DE)

( * ) Notice: Subject to any disclaimer, the term of this patent is extended or adjusted under 35 U.S.C. 154(b) by 905 days.

(21) Appl. No.: 13/513,922

(22) PCT Filed: Dec. 3, 2010

(86) PCT No.: PCT/EP2010/068794
§ 371 (c)(1),
(2), (4) Date: Jul. 24, 2012

(87) PCT Pub. No.: WO2011/069896
PCT Pub. Date: Jun. 16, 2011

(65) Prior Publication Data
US 2012/0281001 A1 Nov. 8, 2012

(30) Foreign Application Priority Data
Dec. 8, 2009 (DE) .......................... 10 2009 057 139

(51) Int. Cl.
*B29C 47/40* (2006.01)
*B29C 47/08* (2006.01)
*B29B 7/48* (2006.01)
*B29C 47/60* (2006.01)
*B29C 47/62* (2006.01)
*B29C 47/00* (2006.01)

(52) U.S. Cl.
CPC ............... *B29C 47/40* (2013.01); *B29B 7/483* (2013.01); *B29C 47/0844* (2013.01); *B29C 47/0854* (2013.01); *B29C 47/0857* (2013.01); *B29C 47/0861* (2013.01); *B29C 47/402* (2013.01); *B29C 47/60* (2013.01); *B29C 47/6075* (2013.01); *B29C 47/0009* (2013.01); *B29C 47/6043* (2013.01); *B29C 47/62* (2013.01)

(58) Field of Classification Search
CPC ............ B29C 47/6056; B29C 47/6062; B29C 47/6043; B29C 47/62; B29C 47/0854; B29C 47/0861
USPC .............................. 366/82, 85, 301
See application file for complete search history.

(56) References Cited

U.S. PATENT DOCUMENTS 3,900,187 A     8/1975  Loomans

FOREIGN PATENT DOCUMENTS

| EP | 1 093 905 | 4/2001 |
|---|---|---|
| EP | 1093905 A2 | 4/2001 |
| WO | 2004/009326 | 1/2004 |

OTHER PUBLICATIONS

Booy "Geometry of Fully Wiped Twin-Screw Equipment", Polymer Engineering and Science, vol. 18 (1978) pp. 973-984; p. 2 of Specification.

(Continued)

*Primary Examiner* — Charles Cooley
*Assistant Examiner* — Marc C Howell
(74) *Attorney, Agent, or Firm* — McBee Moore Woodward & Vanik IP, PLLC

(57) ABSTRACT

The invention relates to a method for constructing bodies which, while rotating codirectionally about axes arranged in parallel, constantly touch one another at at least one point.

12 Claims, 5 Drawing Sheets

(56) References Cited

OTHER PUBLICATIONS

K. Kohlgrueber "The Synchronous Double Screw Extruder", Hanser Verlag (2007); p. 2 of Specification.

M.S. Floater "Derivatives of Rational Beizier Curves", Comp. Aid. Geom. Design 9 (1992) pp. 161-174; p. 12 of Specification.
Teukolsky "Numerical Recipes in Fortran", 2ND Edition, ISBN 0 521 43064 X, p. 180; p. 12 of Specification, published 1992.
International Search Report for PCT/EP2010/068794 Mailed May 20, 2011.

METHOD FOR CONSTRUCTING BODIES THAT ROTATE IN THE SAME DIRECTION AND ARE IN CONTACT WITH ONE ANOTHER AND COMPUTER SYSTEM FOR CARRYING OUT SAID METHOD

CROSS REFERENCE TO RELATED APPLICATIONS

This application is a §371 National Stage Application of PCT/EP2010/068794, filed Dec. 3, 2010, which claims priority to European Application No. 10 2009 057 139.6, filed Dec. 8, 2009.

BACKGROUND OF THE INVENTION

1. Field of the Invention

The invention relates to a method for constructing bodies which, while rotating codirectionally at the same rotational speed about axes arranged in parallel, constantly touch one another at at least one point.

2. Description of Related Art

Let two circles be considered which are arranged next to one another on two parallel axes, as illustrated diagrammatically in FIG. 1. It is generally known that, during codirectional rotation, the circles brush against one another in such a way that, during rotation, they constantly touch one another at a point which lies between the centres of rotation of the circles.

It is known, furthermore, that, in addition to circles, there are further geometric figures which constantly touch one another at a point during codirectional rotation. One example is shown in FIG. 2. These figures constantly touch one another at one point when they are rotating codirectionally at the same rotational speed.

The two-dimensional geometric figures shown in FIGS. 1 and 2 can be continued in various ways into the third dimension. A simple possibility is, for example, the linear continuation of the figures in the direction of the axes of rotation, so as to give rise to disc-shaped or rod-shaped bodies which, during codirectional rotation, brush against one another along a line between the centres of rotation which runs parallel to the axes of rotation.

A further possibility is, for example, to continue the geometric figures along the axes of rotation in a screw-shaped manner, so as to give rise to screw-shaped bodies which, during codirectional rotation, touch one another along a curve between the bodies.

Such bodies which constantly touch one another at at least one point when they rotate codirectionally at the same rotational speed about axes arranged in parallel are important particularly in extruder technology where they are used as codirectionally rotating screw-type extruders, for example for the processing of viscous masses or for mixing purposes. Such synchronous two-shaft and multishaft extruders are known to a person skilled in the art from the patent and specialized literature. The following publication [1] may be mentioned here as an example: K. Kohlgrüber: "*Der gleichläufige Doppelschneckenextruder*", ["*The synchronous double screw extruder*"], Hanser Verlag, 2007. In screw-type extruders, the property whereby adjacent screws brush against one another in pairs when they rotate codirectionally has the advantage that they scrape off one another and therefore clean off one another.

For selected bodies which, when they rotate codirectionally at the same rotational speed about axes arranged in parallel, constantly touch one another at at least one point, there are regulations for their construction.

Thus, for example, it is known from the literature for screw-type extruders (see, for example, [1] pages 96 to 98] that a screw element of the "Erdmenger" type with a cross-sectional profile, as in FIG. 2 of the present application, can be assembled from arcs of a circle.

It is well known, however, what criteria have to be fulfilled in general so that two bodies rotating codirectionally about two axes arranged in parallel touch one another constantly at at least one point.

It is known (see, for example, [2]: Booy "*Geometry of fully wiped twin-screw equipment*", Polymer Engineering and Science 18 (1978) 12, pages 973-984), that the codirectional rotation of two touching bodies about their fixed axes is kinematically equivalent to the "translation without rotation" of one body about the other body which is then stationary. This particular feature can be used for generating in steps geometric figures which constantly touch one another at one point during codirectional rotation. In the consideration, the first figure (the "generated" figure) is stationary and the second figure (the "generating" figure) is displaced about the first in translational motion on an arc of a circle. Part of the profile of the second figure can then be stipulated and it is possible to investigate which profile is thereby generated on the first figure. The generated figure is as it were "cut out" by the generating figure.

However, no general method is known as to how that part of the second figure which is stipulated can itself be generated. In [2], one possible approach is described as to how the profile segment which can be the starting point and from which the remaining profile is generated can be generated. However, this approach is highly complicated in mathematical terms and, above all, is not generally valid, that is to say only those profiles which can be described by the mathematical functions specified in [2] can be generated.

SUMMARY

The set object, therefore, proceeding from the prior art is to provide a general method by means of which bodies can be constructed which, while rotating codirectionally at the same rotational speed about two axes arranged in parallel, constantly touch one another at at least one point.

Surprisingly, the basic principles were found, on which two bodies are based which, when they rotate codirectionally about two axes arranged parallel to one another, constantly touch one another at at least one point.

Proceeding from these basic principles, a general method for constructing such bodies can be derived.

The subject of the present invention is, therefore, a method according to the independent Claim 1 for constructing bodies which, while rotating codirectionally at the same rotational speed about axes arranged parallel to one another, constantly touch one another at at least one point. Preferred embodiments are found in the dependent claims.

DETAILED DESCRIPTION OF A PREFERRED EMBODIMENT

Figure 1:
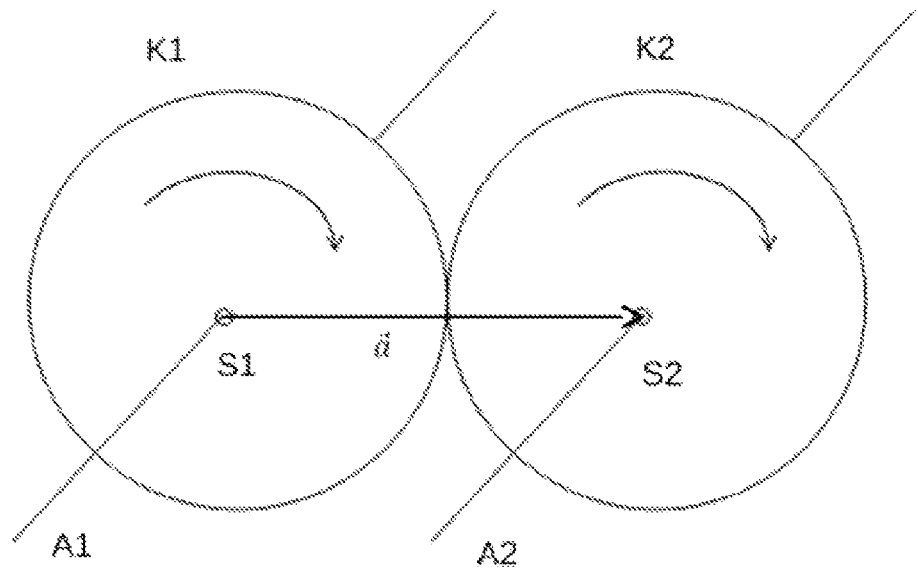
FIGS. 1-7 represent embodiments as described herein.
Figure 2:
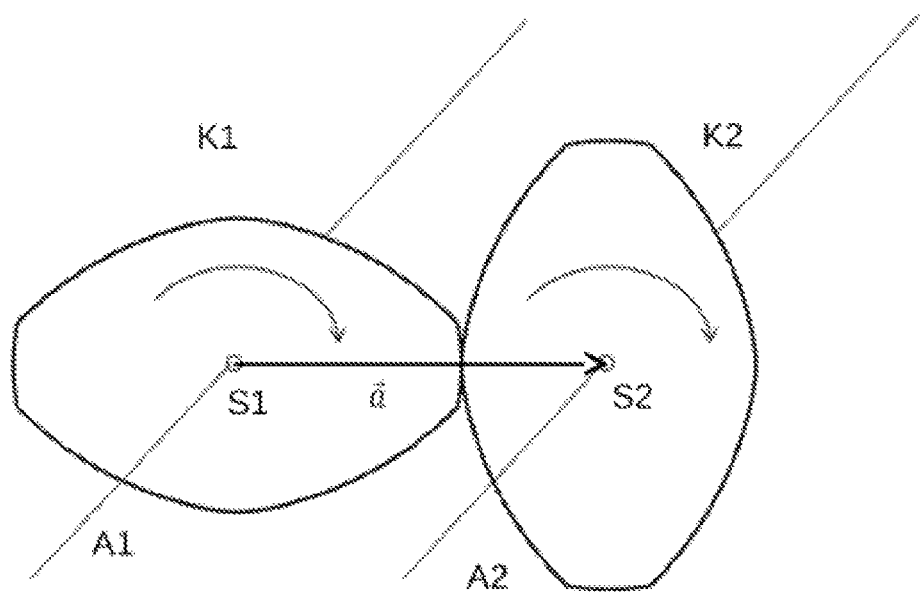

The method according to the invention can be applied to two or more bodies. The bodies are arranged next to one another on parallel axes of rotation running in pairs at a distance a. The method is expediently described for two bodies K1 and K2 which rotate at the same rotational speed about their respective axis. With regard to the arrangement of more than two bodies, the bodies K1 and K2 would always be arranged alternately on adjacent axes of rotation.

The bodies K1 and K2 are also designated here as corresponding bodies for the sake of simplicity.

The rotational speed is the number of revolutions of a body about its axis of rotation per unit time (Hertz unit).

To construct the corresponding bodies K1 and K2, the cross-sectional profiles of these bodies are first generated. The cross-sectional profiles are the profiles which are obtained by cutting the bodies K1 and K2 in a plane E which runs perpendicularly with respect to the axes of rotation A1 and A2.

Surprisingly, it was found that the cross-sectional profile of one body can be stipulated and the cross-sectional profile of the other corresponding body can be derived from this stipulated profile in a simple way. In this case, the profile to be stipulated has to fulfil only a few criteria which are simple to implement. The profile of the corresponding body is derived in a simple way either graphically or mathematically. This makes it possible to construct an extremely large number of different corresponding bodies. Furthermore, as a result, it is possible for the first time to stipulate virtually any body and to derive the body corresponding to it from the stipulated body in a simple way. The method according to the invention is not restricted to cross-sectional profiles which are described by arcs of a circle (as in the case of screw elements of the Erdmenger type, see [1] pages 96 to 98). The method according to the invention is also not restricted to the mathematical functions, described in [2], for the definition of cross-sectional profiles.

In order to name the criteria which the cross-sectional profile to be stipulated has to fulfil, the cross-sectional profile to be stipulated is expediently described as a mathematical curve.

A (mathematical) curve is a one-dimensional object which possess a curvature. In this context, one-dimensional means that it is possible to move only in one direction (or the opposite direction) on the curve. In the present case, the curve lies in a two-dimensional plane E which runs perpendicularly with respect to the axes of rotation A1 and A2.

The intersection points S1 and S2 of the axes of rotation A1 and A2 with the plane E are also designated as centres of rotation of the respective axes. The mutual distance of the centres of rotation S1 and S2 amounts to a.

The curvature of a curve is understood to mean the change in direction per unit length. The curvature of a straight line is everywhere equal to zero because its direction does not change. A circle with the radius r has the same curvature (to be precise, 1/r) everywhere, because its direction changes to the same extent everywhere. With regard to all other curves, the curvature usually changes from curve point to curve point.

The curvature of a curve at a point P therefore indicates how greatly the curve deviates from a straight line in the immediate vicinity of the point P.

The reciprocal of the curvature is called the radius of curvature; this is the radius of the circle (circle of curvature) which constitutes the best approximation in a vicinity of the contact point (see textbooks on mathematics, in particular geometry).

As is known to a person skilled in the art, a curve can be defined as a function of a parameter s by a parametric representation:

$$\vec{p}(s) = \begin{pmatrix} x(s) \\ y(s) \end{pmatrix}$$

In this case, x(s) and y(s) are the coordinates of the points of the curve $\vec{p}(s)$ in the two-dimensional plane E.

The curve which describes the cross-sectional profile of one body K1 must fulfil the following criteria so that a cross-sectional profile of a corresponding body K2 can be generated from the curve:

The curve must be closed.
The curve must be continuous.
The curve must be convex.
The curve must be constantly differentiable segmentally.
The curve $\vec{p}$ must have at any point a radius of curvature $\rho$ which is smaller than or equal to the distance a.

A closed convex curve is known to have the following property: any two points P1 and P2 on the curve are considered. If these points P1 and P2 are connected by a straight line, this straight line leads through the points P1 and P2 of the curve, but, moreover, through no further point on the curve, irrespective of where the points P1 and P2 lie on the curve.

It likewise applies to a convex curve that the curve has a positive curvature at any point. The curve may have one or more kinks. If one or more kinks are present, the curve is constantly differentiable in the segments between the kinks (=constantly differentiable segmentally). Should no kinks be present, the curve is constantly differentiable completely. One possibility for describing kinks mathematically is given further below.

If the abovementioned few criteria which are simple to implement are fulfilled, a curve $\vec{q}$ which describes the cross-sectional profile of the corresponding body K2 can be derived from the curve $\vec{p}$.

Some vectors may also be introduced for this purpose (see, for example, "HÜTTE, das Ingenieurwissen", ["HÜTTE, Engineering"], 32nd edition, ISBN 3-540-20325-7, 2004, page A 59 ff [3]). The notation used corresponds to the standard mathematical notation: a vector is characterized by an arrow above the letter, the dot above the expression is in each case here the derivation according to the parameter, amount lines indicate the amount of a vector, that is to say the root of the scalar product with itself, $|\vec{x}| = \sqrt{\vec{x} \cdot \vec{x}}$, and the cross signifies the parallelepiped product.

Furthermore, it is assumed in the first place, for the sake of simplicity, that the curve is constantly differentiable completely, that is to say has no kinks. In this case, the relations listed below apply unrestrictedly to all the points of the cross-sectional profile. In the case of cross-sectional profiles with one or more kinks, the following relations apply to the constantly differentiable segments between the kinks.

Let $$\vec{t}(\vec{p}) = \frac{\dot{\vec{p}}}{|\dot{\vec{p}}|}$$

be a set of standardized tangent vectors of length 1.

At any point of the curve $\vec{p}$ there is a standardized tangent vector which at the respective point runs tangentially with respect to the curve $\vec{p}$.

Let $$\vec{n}(\vec{p}) = \frac{\vec{t}}{|\vec{t}|}$$

be a set of standardized normal vectors of length 1 which in each case point in the direction of the centre of the circle of curvature belonging to the respective point of the curve $\vec{p}$.

At any point of the curve $\vec{p}$ there is a standardized normal vector which at the respective point is perpendicular to the tangent to the curve $\vec{p}$. This normal vector points in the direction of the centre of that circle (circle of curvature) which approximates the respective curvature for the point of the curve $\vec{p}$. The circle of radius belonging to a point of the curve has the same radius (the same curvature) as the curve at the respective point.

Then, $$\rho = \frac{\dot{s}^3}{|\dot{\vec{p}} \times \ddot{\vec{p}}|}$$

is the radius of curvature with $$\dot{s} = |\dot{\vec{p}}|.$$

Let $\vec{a}$ be a vector of length a, the direction of which leads from the intersection point S1 to the intersection point S2.

The curve $\vec{q}$, which describes the cross-sectional profile of the corresponding body K2 is obtained from the curve $\vec{p}$, describing the cross-sectional profile to be stipulated of the body K1, by means of the following relation:

$$\vec{q} = \vec{p} + a \cdot \vec{n}(\vec{p}) + \vec{a} \quad (1)$$

Figure 3:
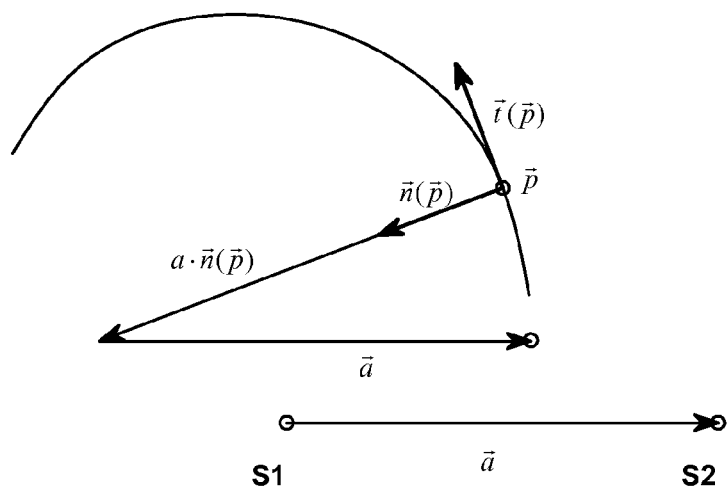

FIG. 3 shows diagrammatically the execution of the method according to the invention by means of a point on a curve. The intersection points S1 and S2 of the axes of rotation are illustrated as small circles. They have a mutual distance a. The vector $\vec{a}$ has the length a and points from S1 to S2. The detail of a curve $\vec{p}$ is shown above the intersection points S1 and S2. A point on the curve is taken out and identified as a small circle. A point on the corresponding curve $\vec{q}$ can be generated from this point of the curve $\vec{p}$. The point on the corresponding curve $\vec{q}$ is obtained in that a tangent $\vec{t}(\vec{p})$ is drawn to the curve at the point of the curve $\vec{p}$, the standardized normal vector $\vec{n}(\vec{p})$ to this tangent is formed and is prolonged by the factor a, and finally the vector $\vec{a}$ is added to this vector $a \cdot \vec{n}(\vec{p})$.

The curve $\vec{p}$ can be described continuously by a single mathematical function. The curve $\vec{p}$ can likewise be described segmentally by various mathematical functions.

The curve $\vec{p}$ must be constantly differentiable segmentally. At the segment limits of a segmentally defined curve $\vec{p}$, the individual segments must therefore not merge constantly differentiably one to the other.

If two curve segments butt one on the other at a kink point, no tangent vector and no normal vector are defined for the kink point. Accordingly, for the kink point of the profile of the body K1, the corresponding segment of the curve $\vec{q}$ of the corresponding body K2 is not obtained directly from the relation (1).

However, it was found, surprisingly, that an arc of a circle in the cross-sectional profile of the body K2 corresponds to each kink in the cross-sectional profile of the body K1.

The size of an arc of a circle is given by the indication of its central angle and of its radius. The central angle of an arc of a circle is designated below in brief as the angle of an arc of a circle. The position of an arc of a circle is given by the position of its centre and by the position of its two end points.

An arc of a circle, corresponding to a kink in the cross-sectional profile of the body K1, in the cross-sectional profile of the body K2 always a radius, the size of which corresponds to the axial distance a. Furthermore, an arc of a circle corresponding to a kink always has an angle which corresponds to that angle at which the tangents to the curve segments meet one another at the kink point.

Conversely it applies accordingly that a corresponding profile segment of the curve $\vec{q}$ is a "kink" when a profile segment of the curve $\vec{p}$ is an arc of a circle with the radius a.

To that extent, it is advantageous to describe a kink by an arc of a circle the radius of which is equal to 0. At a kink a transition of a first curve segment into a second curve segment takes place by rotation through the angle of the arc of a circle with radius zero. A tangent to the first curve segment at the centre of the arc of a circle with the radius zero likewise intersects a tangent to the second curve segment at the centre of the arc of a circle at an angle which corresponds to the angle of the arc of the circle. Taking into account the arc of a circle, all adjacent curve segments (first curve segment→arc of a circle with the radius zero→second curve segment) merge tangentially one into the other. An arc of a circle with a radius zero is expediently treated in the same way as an arc of a circle, the radius of which is equal to eps, eps being a very small positive real number which tends towards 0 (eps<<1, eps→0). An arc of a circle with the same angle and with a radius=axial distance occurs on the corresponding cross-sectional profile.

Figure 7:
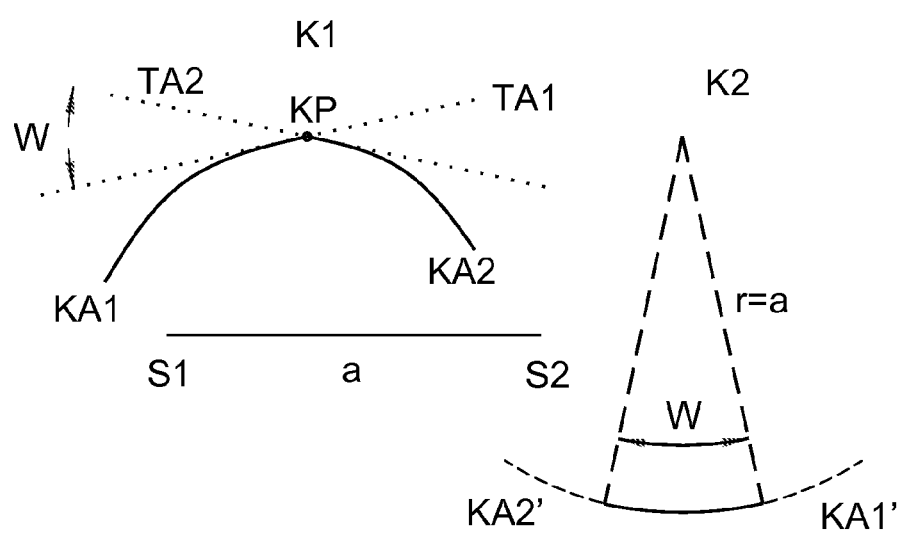
Figure 8:
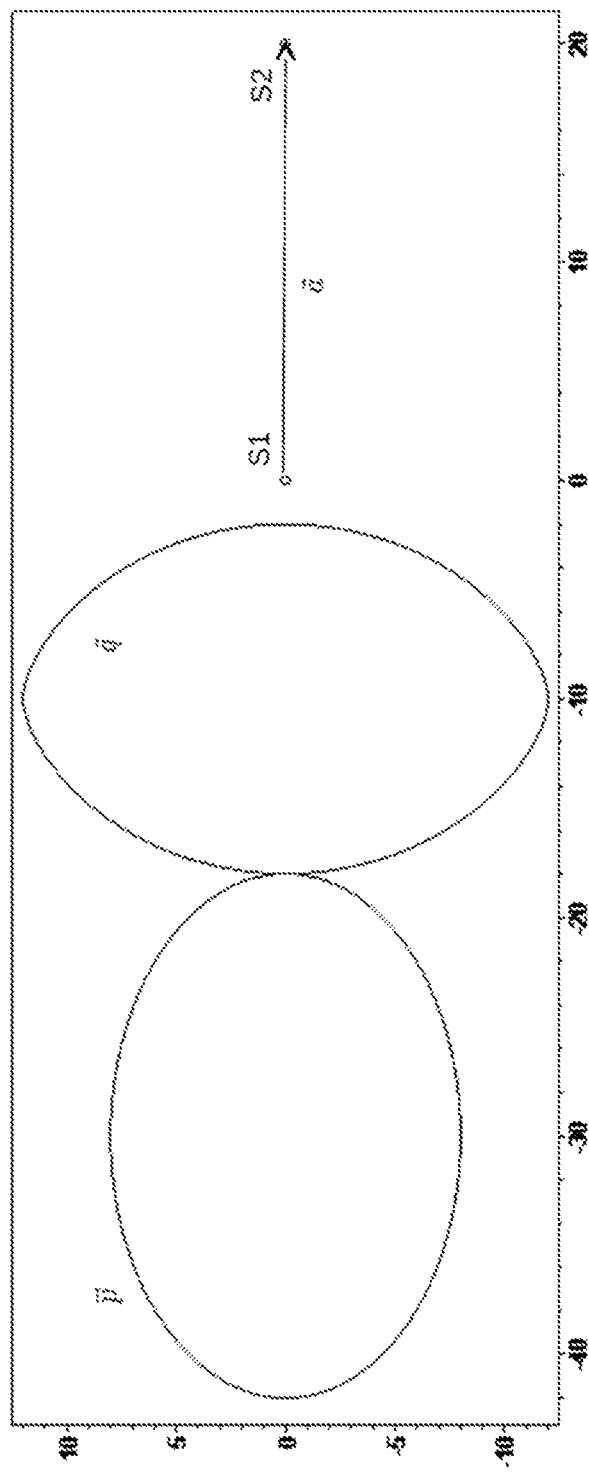

FIG. 7 illustrates the situation described. FIG. 7 shows part of a cross-sectional profile of the body K1 and part of the cross-sectional profile of the resulting body K2. That part of the cross-sectional profile of the body K1 which is shown consists of the curve segments KA1 and KA2. These curve segments meet one another at a kink point KP (represented by a small circle), that is to say the cross-sectional profile of the body K1 has a kink. As explained above, the kink is preferably described by an arc of a circle, the radius of which has the size zero. The angle of the arc of the circle is equal to the angle W at which the tangent TA1 to the curve segment KA1 and the tangent TA2 to the curve segment KA2 butt one on the other at the kink point KP.

In the cross-sectional profile of the body K2 corresponding to the body K1, the segments KA1' and KA2' belonging to the curve segments KA1 and KA2 are obtained from the relation (1): $\vec{q} = \vec{p} + a \cdot \vec{n}(\vec{p}) + \vec{a}$. Here, in each case the curve segments KA1 and KA2 must be inserted in equation (1) for the curve $\vec{p}$, so that the curve segments KA1' and KA2' result as the curve $\vec{q}$. A gap arises between the resulting curve segments KA1' and KA2' which are indicated in FIG. 7 as dashed lines.

In the cross-sectional profile of the corresponding body K2, an arc of a circle with the radius r=a (a=axial distance between the centres of rotation S1 and S2) and with the angle W results from the kink in the cross-sectional profile of the body K1. This arc of a circle closes the gap between the curve segments KA1' and KA2'. The centre of the arc of a circle is obtained by displacing the kink point over the distance a parallel to the connecting line between the points S1 and S2 in the direction of the body K2. This corresponds to a displacement of the kink point by the vector $\vec{a}$. The end points of the resulting arc of a circle are adjacent to the segment limits of the curve segments KA1' and KA2'. Both the size and the position of the resulting arc of a circle are consequently obtained unequivocally from the parameters which describe the kink point as an arc of a circle with the radius zero.

The method according to the invention can consequently be formulated as follows:

The subject of the present invention is a method for generating two bodies K1 and K2 which, while rotating codirectionally at the same rotational speed about two axes of rotation A1 and A2 arranged parallel to one another at a distance a, constantly touch one another at at least one point, characterized in that a cross-sectional profile of the body K1 is formed in a plane E perpendicular to the axes of rotation by a constant, segmentally constantly differentiable, closed convex curve $\vec{p}$, and the cross-sectional profile of the body K2 is formed from the curve $\vec{p}$ according to the relation $$\vec{q} = \vec{p} + a \cdot \vec{n}(\vec{p}) + \vec{a} \quad (1),$$

the curve $\vec{p}$ having at any point a radius of curvature ρ which is smaller than or equal to the distance a, for any point of the curve $\vec{p}$ within a constantly differentiable segment, there being a standardized normal vector $\vec{n}(\vec{p})$ of length 1 which at the respective point is perpendicular to the tangent to the curve $\vec{p}$ and points in the direction of the centre of the circle of curvature belonging to the respective point of the curve $\vec{p}$, $\vec{a}$ being a vector which leads in the direction of the intersection point S1 of the axis of rotation A1 with the plane E to the intersection point S2 of the axis of rotation A2 with the plane E and possesses the length a, in the case of a kink in a cross-sectional profile of the body K1, the cross-sectional profile of the body K2 having an arc of a circle, the radius of which corresponds to the axial distance a and the angle of which corresponds to that angle at which the tangents to the curve segments of the curve $\vec{p}$ butt one on the other at the kink point.

The intersection point S1 may lie inside the closed curve $\vec{p}$ or outside it. The intersection point S1 preferably lies inside the closed curve $\vec{p}$.

The closed curve $\vec{p}$ may have mirror symmetry, point symmetry or rotational symmetry. In so far as the closed curve $\vec{p}$ has mirror symmetry, the intersection point S1 preferably lies on the axis of symmetry. In so far as the closed curve $\vec{p}$ has more than one mirror symmetry, the intersection point S1 preferably lies on the intersection point of at least two axes of symmetry of the curve $\vec{p}$. In so far as the closed curve $\vec{p}$ has point symmetry, the intersection point S1 preferably lies on the symmetry point. In so far as the closed curve $\vec{p}$ has rotational symmetry, the intersection point S1 preferably lies on the centre of rotation of the profile.

If the intersection point S1 lies inside or on the curve $\vec{p}$ all the points on the curve $\vec{p}$ have a maximum distance a and a minimum distance of 0 from the intersection point S1.

The curve $\vec{p}$ can, for example, be described continuously by a single mathematical function. Functions known to a person skilled in the art, such as circular functions or elliptical functions, parabolic functions or hyperbolic functions, may be mentioned as examples. It is also possible, for example, to represent functions in the form $$\vec{p} = (r_0 - f(s)) \cdot \begin{pmatrix} \cos(s) \\ \sin(s) \end{pmatrix} + \begin{pmatrix} x_0 \\ y \end{pmatrix},$$

as a result of which a gap of freely selectable configurations is obtained, in the design of screw elements, between a housing with a radius $r_0$ and the rotating screw element, depending on the form of the function $f(s)$. For example, $f(s)$ may be a linear function or quadratic function of s, a hyperbolic function or an exponential function.

Furthermore, functions, the values of which are determined by checkpoints, such as, for example, B-spline functions, Bézier functions, rational Bézier functions and non-uniform rational B-splines (NURBS), are mentioned. Bézier functions, rational Bézier functions and NURBS are preferred because they are often used in the construction using CAD systems (CAD=Computer Aided Design) and there serve, above all, for defining any forms in a geometrically clear way by the displacement of checkpoints.

Bézier functions will be given here as an example. Bézier functions are known to have the form $$\vec{C}(t) = \Sigma_{i=0}^{n} B_{i,n}(t) \vec{P}_i$$

$\vec{P}_i$ being the coordinates of the checkpoints and $$B_{i,n}(t) = \binom{n}{i} t^i (1-t)^{n-i}$$

being a Bernstein polynomial.

Rational Bézier functions of degree n, which are described, for example, in M. S. Floater "Derivatives of rational Bézier curves", Comp. Aid. Geom. Design 9, 1992, 161-174 [4], are known to have the form $$\vec{P}(t) = \frac{\sum_{i=0}^{n} B_{i,n}(t) w_i \vec{P}_i}{\sum_{i=0}^{n} B_{i,n}(t) \vec{P}_i},$$

$\vec{P}_i$ representing the coordinates of the checkpoints of the function and $w_i$ representing their weighting.

Quadratic and cubic, (that is to say, with n=2 and n=3) Bézier functions and cubic rational Bézier functions are especially preferred.

The derivations necessary for executing the method can be obtained by a person skilled in the art, using the generally known rules of mathematics. Various methods are indicated, for example, in [4] for rational Bézier functions. The use of a computer algebra system for the calculation of derivations is also advantageous. Another possibility is to approximate the derivations from existing numerical data, for example by differentiation. Such methods are known to a person skilled in the art and are illustrated, for example, in Press, Teukolsky, Vetterling, Flannery: "Numerical Recipes in FORTRAN", 2nd edition, ISBN 0 521 43064 X, page 180 ff [5].

The curve $\vec{p}$ can likewise be described segmentally by various mathematical functions, the segmental functions preferably corresponding to the functions mentioned in the previous paragraph.

A special case of segmental description by mathematical functions is description by arcs of a circle. It is possible to describe part or all of the curve $\vec{p}$ and therefore part or all of the cross-sectional profile of the body K1 by arcs of a circle. The relation $\vec{q} = \vec{p} + a \cdot \vec{n}(\vec{p}) + \vec{a}$ indicates that, in this case, the curve $\vec{q}$ and consequently the cross-sectional profile of the body K2 corresponding to the body K1 are also composed of arcs of a circle.

If profiles are generated segmentally by the method according to the invention, the corresponding profile segments of the bodies K1 and K2 may also change from segment to segment. In this case, after a segment of $\vec{p}_n$ is stipulated and the corresponding segment of $\vec{q}_n$ is determined, a curve segment $\vec{p}_{n+1}$ is stipulated which merges tangentially into $\vec{q}_n$ and, according to the relation (1), with interchanged S1 and S2 (that is to say, replacement of $\vec{a}$ by $-\vec{a}$), gives a curve segment $\vec{q}_{n+1}$ which merges tangentially into the previous curve segment $\vec{p}_n$.

The method according to the invention can surprisingly be executed on paper merely with an angle ruler and compasses.

It is therefore even possible, in principle, to generate the cross-sectional profile of one body simply by hand and to derive the cross-sectional profile of the corresponding body graphically from the profile stipulated graphically.

For this purpose, expediently, first the centres of rotation S1 and S2 are drawn into one plane. The distance between the centres of rotation amounts to a. The cross-sectional profile of the body K1 is drawn fully or completely into the plane of the points S1 and S2. In this case, the criteria listed above apply to generating the profile of the body K1.

Each individual point of the cross-sectional profile of a corresponding body K2 can be derived from the individual points of the stipulated cross-sectional profile of a body K1.

The cross-sectional profiles of corresponding bodies can be continued in various ways into the third dimension in order to generate bodies which, when rotating codirectionally at the same rotational speed about axes arranged parallel to one another, constantly touch one another at at least one point. This may be explained, for example, by means of screw elements for screw-type extruders, since the method according to the invention is employed preferably for generating screw elements.

However, the method according to the invention is not restricted to screw elements from the currently customary modular type of construction of a screw from the screw elements and core shafts, but can also be applied to screws of a solid type of construction. The term "screw elements" must therefore be understood as also meaning screws of a solid type of construction.

Screw elements may be designed, for example, as conveying, kneading or mixing elements.

A conveying element is distinguished (see, for example, [1], pages 227-248) in that the screw profile is continued by being continuously rotated helically in the axial direction. In this case, the conveying element may be right-handed or left-handed. The pitch of the conveying element is preferably in the range of 0.1 times to 10 times the axial distance, the pitch being understood as meaning the axial length which is necessary for a complete rotation of the screw profile, and the axial length of a conveying element preferably lying in the range of 0.1 times to 10 times the axial distance. The direction, pitch and axial length are identical in adjacent screw elements (corresponding bodies).

A kneading element is distinguished (see, for example [1], pages 227-248) in that the screw profile is continued in steps in the axial direction in the form of kneading discs. The arrangement of the kneading discs may be right-handed or left-handed or neutral. The axial length of the kneading discs is preferably in the range of 0.05 times to 10 times the axial distance. The axial distance between two adjacent kneading discs preferably lies in the range of 0.002 times to 0.1 times the axial distance. The direction and axial length of the kneading discs are identical in adjacent screw elements (corresponding bodies).

Mixing elements are formed (see, for example [1], pages 227-248) in that conveying elements are designed with perforations in the screw ridges. The mixing elements may be right-handed or left-handed. Their pitch preferably lies in the range of 0.1 times to 10 times the axial distance, and the axial length of the elements preferably lies in the range of 0.1 times to 10 times the axial distance. The perforations are preferably in the form of a u-shaped or v-shaped groove and are preferably arranged in a counter-conveying or axially parallel manner. The direction, pitch and axial length are identical in adjacent screw elements (corresponding bodies).

In order to make transition between various screw elements possible, shims are often used as a spacer sleeve. In special cases, transition elements, as they are known, are employed which allow continuous transition between two screw profiles with a different number of starts, a self-cleaning pair of screw profiles being present at each point at the transition. Transition elements may be right-handed or left-handed. Their pitch preferably lies in the range of 0.1 times to 10 times the axial distance, and their axial length preferably lies in the range of 0.1 times to 10 times the axial distance. The direction, pitch and axial length are identical in adjacent screw elements (corresponding bodies).

The present invention makes it possible to generate profiles of corresponding bodies from the outset. In contrast to the prior art, the method according to the invention does not proceed from existing profiles, but instead makes it possible to generate any profiles in steps by observing simple rules. The method according to the invention is generally valid, that is to say it is not restricted to specific types of bodies (for example screw elements of the Erdmenger type).

As already stated, the method according to the invention can be executed on paper merely with an angle ruler and compasses. It is advantageous to execute the method according to the invention on a computer system, since the coordinates and dimensions of the profiles are in a form which can be processed further by a computer.

The subject of the present invention is therefore also a computer system for executing the method according to the invention on a computer.

The computer system preferably has a graphical user interface (GUI) which enables a user in a simple way to input the freely selectable variables for generating profiles via input devices, such as, for example, a mouse and/or keyboard. The computer system especially preferably has a possibility for indicating contours of profiles with the aid of checkpoints and, where appropriate, weightings in the case of functions, the values of which are defined by checkpoints, functions, the values of which are determined by checkpoints, such as, for example, B-spline functions, Bézier functions, rational Bézier functions and non-uniform rational B-splines (NURBS), and this can take place in the form of numbers (coordinates), graphically or by a combination of graphical and numerical input. Furthermore, the computer system preferably has a graphical output, by means of which the calculated profiles can be displayed on a graphical output device, such as, for example, a video screen and/or printer. The computer system preferably has the possibility of exporting calculated profiles, that is to say in the form of storable data records, which comprise the geometric dimensions of the calculated bodies, either storing them on a data carrier for further intended uses or transferring them to a connected device. The computer system is preferably configured such that it can calculate both cross-sectional profiles and bodies generated from the cross-sectional profiles and can output the calculated geometries in a format which can be used by a machine for the production of such bodies, for example a machine tool, for example a milling machine, in order to produce real bodies. Such formats are known to a person skilled in the art.

After the three-dimensional profiles have been generated in the way described, the bodies can be generated, for example, by means of a milling machine, a lathe or a spinning machine. Preferred materials for generating bodies of this type are steels, in particular nitrided steels, chromium steels, tool steels and high-grade steels, metallic composite materials produced by powder metallurgy and based on iron, nickel or cobalt, engineering-ceramic materials, such as, for example zirconium oxide or silicon carbide, if the bodies are extruder screws.

Screw elements for double-screw or multi-shaft extruders are usually introduced into a housing. In this case, the screw elements and housings are designed such that, as a result of the rotating of the screw elements, not only are adjacent screw elements scraped off in pairs, but also the housing inner walls are cleaned off due to the rotation of the screw elements.

As stated, for example, in the publication [1] on pages 27 to 30, arrangements composed of screw elements and the housing always have, in practice, what are known as plays. As is known to a person skilled in the art, the plays between screw and housing and between screw and screw may be different or identical. The play between screw and housing is designated as $\delta$ and the play between screw and screw as s. The plays may also be constant or, within the limits indicated, variable. It is also possible to displace a screw profile within the plays.

On account of the plays which exist, therefore, the screw elements used in practice do not strictly have the property whereby, during codirectional rotation at the same rotational speed about axes arranged in parallel, they touch one another at at least one point.

Nevertheless, in practice, the starting point for generating screw elements is usually the exactly scraping-off contours (profiles), and then plays are introduced. According to the invention, first, bodies (screw elements) are therefore generated preferably virtually, which, while rotating codirectionally at the same rotational speed about axes arranged in parallel, touch one another at at least one point. Proceeding from these preferably virtual geometries, plays are provided which prevent the screw elements used in practice from "seizing".

A person skilled in the art knows methods for deriving a screw profile with plays from a stipulated exactly scraping-off screw profile. Known methods for this purpose are, for example, the possibility described in [1] on pages 28 ff, of the axial distance increase, longitudinal section equidistants and spatial equidistants. With the axial distance increase, a screw profile of smaller diameter is constructed and is shifted apart by the amount of play between the screws. In the longitudinal section equidistant method, the longitudinal section profile curve (parallel to the axis of rotation of the respective elements) is displaced by half the screw/screw play perpendicularly to the profile curve inwards in the direction towards the axis of rotation. In the spatially equidistant method, starting from the three-dimensional curve on which the screw elements clean themselves off, the screw element is reduced by half the play between screw and screw in the direction perpendicular to the surfaces of the exactly scraping-off profile.

Eccentric positioning of screw elements in a housing, while preserving the housing scrape-off and the scrape-off in pairs, is also known to a person skilled in extruder technology (see for example [1] pages 108, 246 and 249).

The use of housings, plays and/or eccentric positioning can be applied accordingly to a corresponding bodies which, when rotating codirectionally about two axes arranged in parallel, brush against one another in such a way that they constantly touch one another at at least one point.

A further subject of the present invention is therefore a method for generating screw elements. The method according to the invention for generating screw elements is characterized in that, in a first step, the cross-sectional profiles of bodies which, while rotating codirectionally at the same rotational speed about axes of rotation arranged parallel to one another at a distance a, constantly touch one another at at least one point are generated by the method described above. In a second step, plays are introduced, for example, according to the methods of axial distance increase, longitudinal section equidistants and/or spatial equidistants.

The play between the screw elements preferably lies in the range of 0.002-times to 0.1 times the axial distance, and the play between screw and housing preferably lies in the range of 0.002 times to 0.1 times the axial distance.

The invention is explained in more detail below by means of examples, without however being restricted to these.

In the following examples, no units are used, but instead only dimensionless variables (numbers) are used for lengths. In technical implementation, these numbers can be transferred to a technical embodiment on any desired scale.

EXAMPLE 1

Let an elliptical profile be given by parametric representation $$\vec{p}(s) = \begin{pmatrix} 29\cos(s) \\ 19\sin(s) \end{pmatrix},$$

$$s \in [0 \ldots 2\pi[$$

Let the axial distance amount to 48, the centre of rotation of the elliptical profile lie at the coordinate origin and the centre of rotation of the second profile be $$\begin{pmatrix} 48 \\ 0 \end{pmatrix}.$$

The curve radius is $$\rho = \frac{1}{551}(-480\cos^2 s + 841)^{\frac{3}{2}}$$

The maximum value of the curve radius amounts to about 44.26, that is to say is smaller than the axial distance. The profile is therefore permissible.

The normal vector is then $$\vec{n}(s) = \begin{pmatrix} -\dfrac{19\cos s}{\sqrt{841 - 480\cos^2 s}} \\ -\dfrac{29\sin s}{\sqrt{841 - 480\cos^2 s}} \end{pmatrix}$$

The contour of the generated screw profile is then $$\vec{q}(s) = \begin{pmatrix} \dfrac{\cos s(-912 + 29\sqrt{841 - 480\cos^2 s})}{\sqrt{841 - 480\cos^2 s}} + 48 \\ -\dfrac{\sin s(-1392 + 19\sqrt{841 - 480\cos^2 s})}{\sqrt{841 - 480\cos^2 s}} \end{pmatrix}$$

Figure 4:
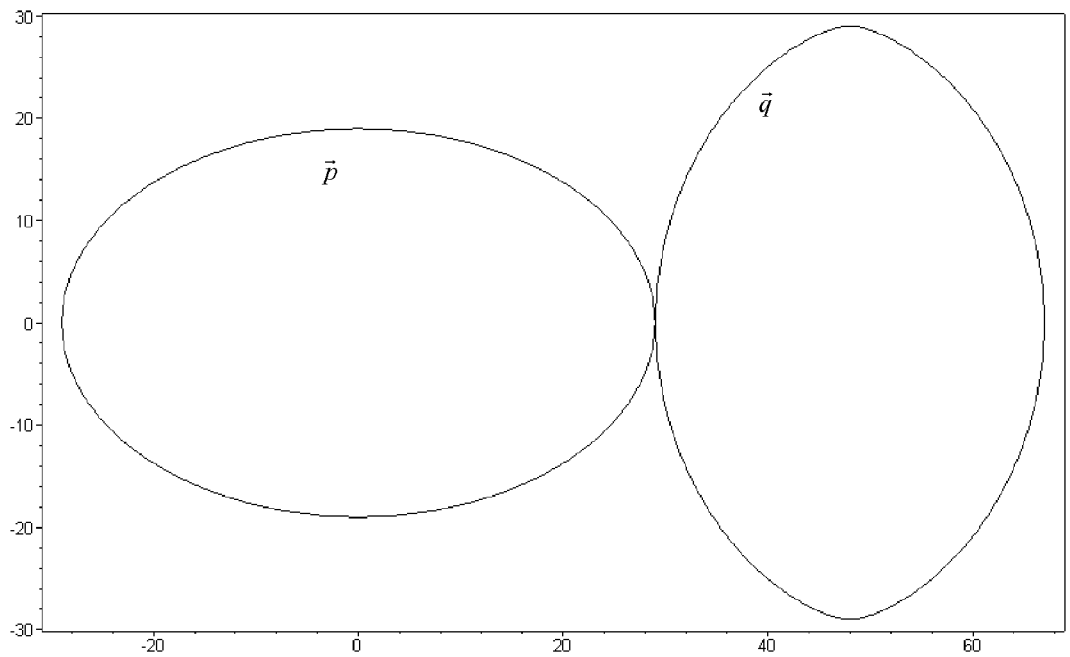

FIG. 4 shows the two contours, the generating ellipse on the left and the generated contour on the right.

EXAMPLE 2

Let a segment of a generating screw contour $\vec{p}$ be illustrated by a cubic Bézier curve with the checkpoints $$P_0 = \begin{pmatrix} 1 \\ 3.6 \end{pmatrix},$$

$$P_1 = \begin{pmatrix} 2.8 \\ 3 \end{pmatrix},$$

$$P_2 = \begin{pmatrix} 3.8 \\ 0.6 \end{pmatrix},$$

$$P_3 = \begin{pmatrix} 3.6 \\ -0.8 \end{pmatrix}.$$

Let the axial distance be 10, the centre of rotation of the generating profile be at the coordinate origin and the centre of rotation of the generated profile be at $$\begin{pmatrix} 10 \\ 0 \end{pmatrix}.$$

The curve has the parametric representation $$\vec{p}(s) = \begin{pmatrix} 1 + 5.4s - 2.4s^2 - s^3 \\ 3.6 - 1.8s - 5.4s^2 + 2.8s^3 \end{pmatrix}, s \in [0 \ldots 1]$$

The radius of curvature has a maximum of about 3.87 for t=0.445, this being less than the axial distance of 10, and therefore this curve is permissible.

Figure 5:
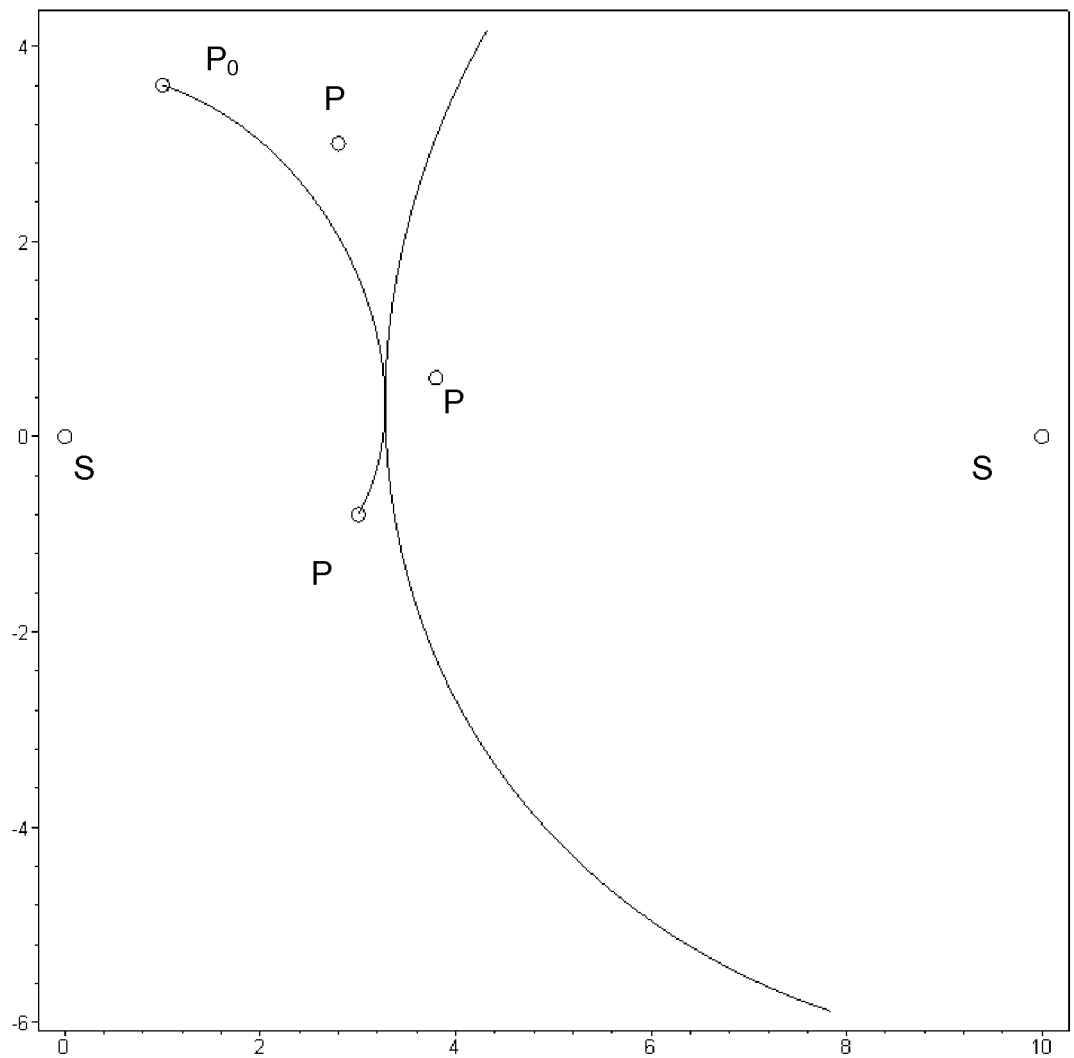

FIG. 5 shows the curve according to the invention. The points $S_1$ and $S_2$, indicated by circles, are the centres of rotation of the cross-sectional profiles of the corresponding bodies. The checkpoints P0 to P4 are likewise depicted by circles. Furthermore, the figure shows the contour $\vec{p}$ and the contour $\vec{q}$ corresponding to it.

EXAMPLE 3

Let part of an elliptical profile as a generating profile be given by the parametric representation $$\vec{p}_1(s) = \begin{pmatrix} 29\cos(s) \\ 19\sin(s) \end{pmatrix},$$

$$s \in [0 \ldots \frac{\pi}{2}[$$

This profile corresponds to part of the profile from Example 1. The axial distance is likewise as in the Example 1. The following is then applicable accordingly:

$$\vec{q}_1(s) = \begin{pmatrix} \dfrac{\cos s(-912 + 29\sqrt{841 - 480\cos^2 s})}{\sqrt{841 - 480\cos^2 s}} + 48 \\ -\dfrac{\sin s(-1392 + 19\sqrt{841 - 480\cos^2 s})}{\sqrt{841 - 480\cos^2 s}} \end{pmatrix}, s \in [0 \ldots \frac{\pi}{2}[$$

After $\vec{q}_1$, $\vec{p}_1$ is defined as parts of an ellipse as $$\vec{p}_2(s) = \begin{pmatrix} 19\sin(s) + 48 \\ 29\cos(s) \end{pmatrix},$$

$$s \in [\frac{\pi}{2} \ldots \pi[,$$

the centre of rotation of the generating profile $$\begin{pmatrix} 48 \\ 0 \end{pmatrix}$$

and of the generated profile being drawn to the coordinate origin. This results in $$\vec{q}_2(s) = \begin{pmatrix} \dfrac{\sin s(-1392 + 19\sqrt{841 - 480\cos^2 s})}{\sqrt{841 - 480\cos^2 s}} \\ \dfrac{\cos s(-912 + 29\sqrt{841 - 480\cos^2 s})}{\sqrt{841 - 480\cos^2 s}} \end{pmatrix}, s \in [\frac{\pi}{2} \ldots \pi[$$

Accordingly, with repeated change of the generating and the generated profile, the following is obtained:

$$\vec{p}_3(s) = \begin{pmatrix} 29\cos(s) \\ 19\sin(s) \end{pmatrix}, s \in [\pi \ldots \frac{3}{2}\pi[$$

$$\vec{q}_3(s) = \begin{pmatrix} \dfrac{\cos s(-912 + 29\sqrt{841 - 480\cos^2 s})}{\sqrt{841 - 480\cos^2 s}} + 48 \\ -\dfrac{\sin s(-1392 + 19\sqrt{841 - 480\cos^2 s})}{\sqrt{841 - 480\cos^2 s}} \end{pmatrix}, s \in \left[\pi \ldots \dfrac{3}{2}\pi\right[$$

and, by repeated change of the generating and generated profile $$\vec{p}_4(s) = \begin{pmatrix} 19\sin(s) + 48 \\ 29\cos(s) \end{pmatrix},$$

$$s \in \left[\dfrac{3}{2}\pi \ldots 2\pi\right[$$

$$\vec{q}_4(s) = \begin{pmatrix} \dfrac{\sin s(-1392 + 19\sqrt{841 - 480\cos^2 s})}{\sqrt{841 - 480\cos^2 s}} \\ \dfrac{\cos s(-912 + 29\sqrt{841 - 480\cos^2 s})}{\sqrt{841 - 480\cos^2 s}} \end{pmatrix}, s \in \left[\dfrac{3}{2}\pi \ldots 2\pi\right[$$

Figure 6:
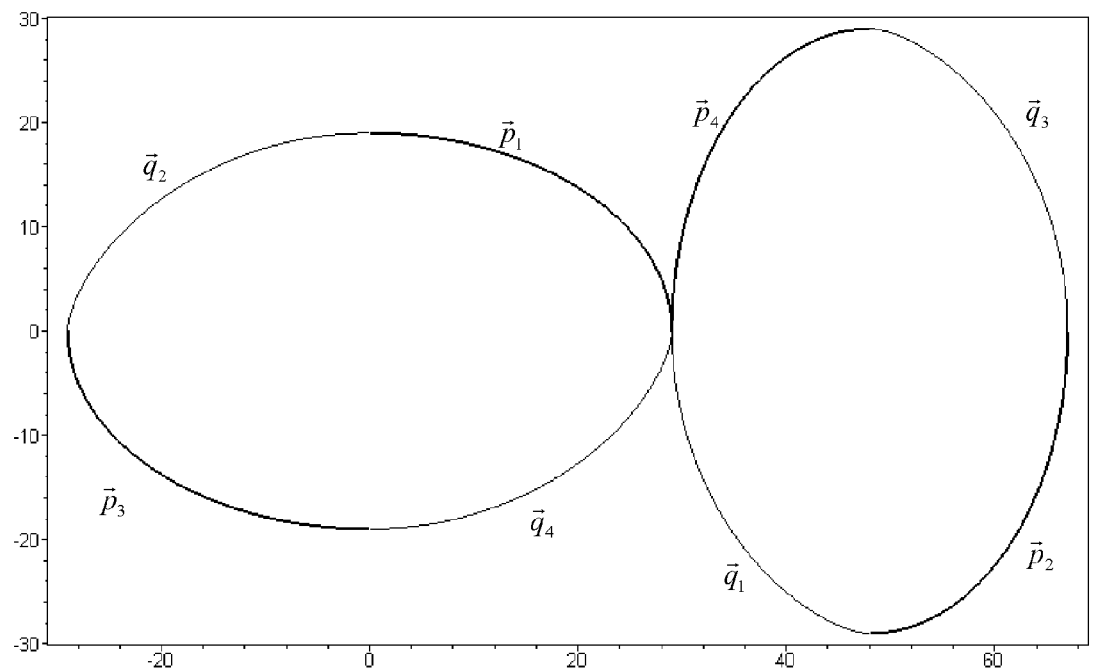

The overall screw contour thereby occurring is illustrated in FIG. 6.

The invention claimed is:

1. A method for generating a profile of bodies K1 and K2 which, while rotating codirectionally at a same rotational speed about two axes of rotation A1 with regard to body K1 and A2 with regard to body K2 arranged parallel to one another at a distance a, constantly touch one another at at least one point, said method comprising as a first step forming a cross-sectional profile of the body K1 in a plane E perpendicular to axes of rotation by a constant, segmentally constantly differentiable, closed convex curve $\vec{p}$, and as a second step, forming a cross-sectional profile of the body K2 from the curve $\vec{p}$, according to $$\vec{q} = \vec{p} + a \cdot \vec{n}(\vec{p}) + \vec{a} \qquad (1),$$

said $\vec{q}$ being a curve describing the cross-sectional profile of the corresponding body K2, said curve $\vec{p}$, having at any point a radius of curvature p which is smaller than or equal to distance a, for each point of said curve $\vec{p}$, within a constantly differentiable segment, there being a standardized normal vector $\vec{n}(\vec{p})$ of length 1 which at each point is perpendicular to a tangent to said curve $\vec{p}$, and points in a direction of a centre portion of a circle of curvature belonging to the respective point of said curve $\vec{p}$, $\vec{a}$ being a vector which leads in a direction from an intersection point S1 of the axis of rotation A1 with the plane E to an intersection point S2 of the axis of rotation A2 with the plane E and possesses a length equal to the distance a, and in a case of a kink in said cross-sectional profile of the body K1, said cross-sectional profile of the body K2 having an arc of a circle, the radius of which corresponds to the distance a and an angle of which corresponds to an angle at which tangents to curve segments of said curve $\vec{p}$, abut one another at a kink point wherein said curve $\vec{p}$ is described by a single mathematical function, the said single mathematical function being selected from the series consisting of the following members:
B-spline function, Bézier function, rational Bézier function, non-uniform rational B-spline function,
or wherein said curve $\vec{p}$ is described segmentally by various mathematical functions, at least one of these said various mathematical functions is selected from the series consisting of the following members:
B-spline function, Bézier function, rational Bézier function, non-uniform rational B-spline function.

2. The method according to claim 1, wherein said point S1 lies outside said curve $\vec{p}$.

3. The method according to claim 1, wherein said point S1 lies on or inside said curve $\vec{p}$.

4. The method according to claim 3, wherein said intersection point S1 lies on an intersection point of at least two axes of symmetry of said curve $\vec{p}$ or said intersection point S1 lies at a symmetry point of said curve $\vec{p}$ or said intersection point S1 lies on a centre of rotation of said curve $\vec{p}$.

5. The method according to claim 1, wherein said curve $\vec{p}$, has one or more kinks.

6. The method according to claim 5, wherein said curve $\vec{p}$, is described at kink points by an arc of a circle with radius eps which merges tangentially into two adjacent curves, eps being a very small positive real number which tends towards 0 (eps<<1, eps→0).

7. The method according to claim 1, wherein bodies K1 and K2 are screw elements.

8. The method according to claim 1, wherein said cross-sectional profiles are continued helically in an axial direction, the bodies generated in this way being right-handed or left-handed, and a pitch standardized to the distance a lying in a range of 0.1 to 10, and lengths, standardized to the distance a, of bodies K1 and K2 lying in a range of 0.1 to 10.

9. The method according to claim 1, wherein said cross-sectional profiles are segmentally continued linearly in an axial direction, and a length, standardized to the distance a, of the bodies K1 and K2 lies in a range of 0.05 to 10.

10. A method for generating screw elements, wherein said, in a first step, generating by a method of claim 1 cross-sectional profiles of bodies which, while rotating codirectionally at the same rotational speed about axes of rotation arranged parallel to one another at a distance a, constantly touch one another at least one point and, in a second step, introducing plays between the bodies K1 and K2.

11. A computer system for executing a method according to claim 1.

12. A computer system according to claim 11, associated with a machine tool for generating calculated bodies.

* * * * *